L. A. MAGRAW.
TRANSPOSITION TOWER.
APPLICATION FILED MAR. 8, 1913.
1,110,068.
Patented Sept. 8, 1914.
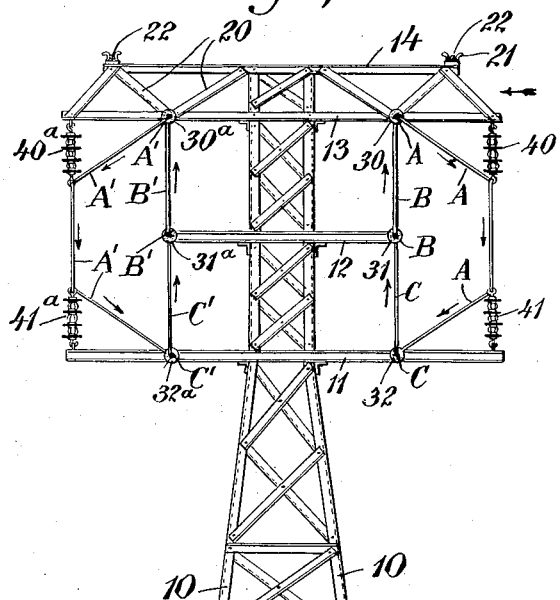
Fig. 1,
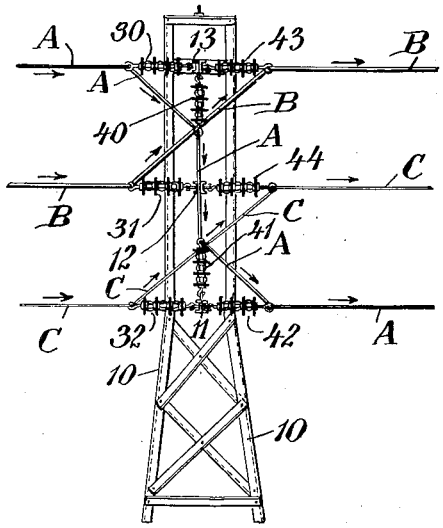
Fig. 2
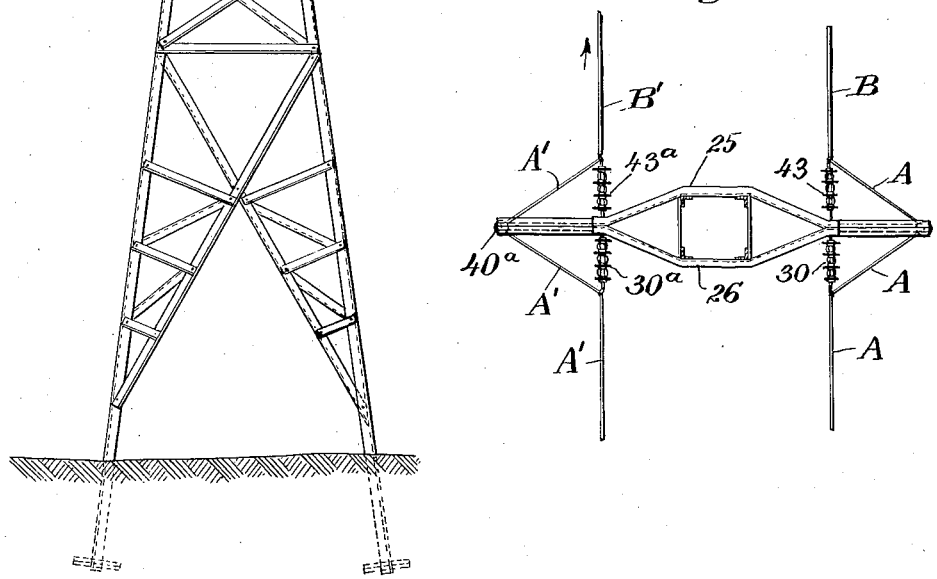
Fig. 3,
WITNESSES
E. W. Marshall
F. B. Graves.
INVENTOR
Lester A. Magraw
BY
P. T. Dearborn
ATTORNEY

UNITED STATES PATENT OFFICE.

LESTER A. MAGRAW, OF MACON, GEORGIA.

TRANSPOSITION-TOWER.

1,110,068. Specification of Letters Patent. Patented Sept. 8, 1914.

Application filed March 8, 1913. Serial No. 752,880.

*To all whom it may concern:*

Be it known that I, LESTER A. MAGRAW, a citizen of the United States, and a resident of Macon, county of Bibb, and State of Georgia, have invented certain new and useful Improvements in Transposition-Towers, of which the following is a specification, reference being had to the accompanying drawings, forming a part thereof.

My invention relates to means for supporting electric circuit conductors and its object is to provide a relatively simple supporting structure which is adapted to effect a transposition or rearrangement of high voltage electric transmission circuit conductors.

In my co-pending application Serial No. 752,879 filed of even date herewith, I have shown and described a transmission tower which is adapted to support two groups of three electric transmission circuit conductors and in the preferred embodiment of my present invention, I provide a supporting tower which is adapted for use in conjunction with a plurality of other towers such for example as are shown in my co-pending application, in order to transpose or change the relative positions of the transmission circuit conductors at suitable intervals on the line.

I will describe my invention in the following specification and point out the novel features thereof in appended claims.

In the drawings, Figure 1 is an elevation of a transposition tower constructed in accordance with my invention. Fig. 2 is a view at right angles to Fig. 1 with the lower part of the body of the tower broken away. Fig. 3 is a plan view of the top of the tower shown in the other figures.

Like characters of reference designate corresponding parts in all the figures.

Referring to the drawings, the structure here shown comprises longitudinal corner beams 10 preferably in the form of iron or steel angle beams which are parallel near the top of the tower and are connected by inclined stays or braces to form a box beam structure and a plurality of cross arms 11, 12, 13 and 14. The corner beams 10 diverge from the lowest cross arm 11 to their lower ends and are further provided with both inclined and horizontal braces so that a particularly rigid, pyramidal structure is produced. The cross arms 11 and 13 are of substantially equal length and are considerably longer than the intermediate cross arm 12. The top cross arm 14 is located at the top of the tower and only a comparatively short distance above the cross arm 13. The cross arms 13 and 14 are connected by inclined braces 20 and the arm 14 is provided with connecting supports 21 near its respective ends to receive ground wires 22. The cross arms comprise two side strips such as 25 and 26 (Fig. 3) secured to opposite sides of the box beam top section of the tower and bent close together at their respective ends. The central portions of the cross arms 11 and 13 correspond exactly to the cross arm 12 but the ends of the strips where they are close together, are extended to materially increase the length of these arms.

A group of transmission circuit conductors A, B, C are secured to the outer ends of strain insulators 30, 31 and 32 which are in vertical alinement and are secured at their inner ends to the cross arms 11, 12 and 13, the insulator 31 being near the end of the cross arm 12. A corresponding set of transmission circuit conductors A′, B′, C′ are secured to the outer ends of strain insulators 30ª, 31ª and 32ª which are located on the opposite side of the tower and are also arranged in vertical alinement.

From the strain insulator 30 the conductor A extends outwardly and downwardly to the lower end of a strain insulator 40 which is suspended from a point near one end of the cross arm 13. From this point this conductor extends downwardly to the upper end of a strain insulator 41 the lower end of which is secured near the outer end of the arm 11. It extends thence downwardly and inwardly and is secured to the outer end of a strain insulator 42 which is secured to the cross arm 11 at a point opposite the strain insulator 32, the wire extending from this point in the direction indicated by the arrows.

The conductor B extends diagonally upward from the outer end of the strain insulator 31 to the outer end of a strain insulator 43 which is secured to the cross arm 13 at a point substantially opposite the insulator 30. The conductor C extends from the outer end of the insulator 32 diagonally upward to the outer end of a strain insulator 44 which is secured to the arm 12 opposite the insulator 31. Thus the conductor A departs from the tower substantially in alinement with the approaching end of the conductor C while the conductors B and C depart from the tower substantially in alinement with the approaching ends of the conductors A and B respectively. The conductors A', B' and C' are correspondingly transposed.

By utilizing several transposition towers spaced at substantially equal distances by a comparatively large number of other transmission towers, I am able to effect a complete transposition of the conductors.

The arrangement of my present invention which effectively spaces the conductors at the point of transposition is preferable to those heretofore used which embody a transposition of the conductors in the span between two towers, particularly for high voltage conductors which are secured to suspension type insulators and are liable to swing into contact if they are crossed.

The size of the insulators and the distances maintained between the conductors will of course be dependent upon the potential of the electric circuit conductors which are transposed.

Variations in size and arrangement of parts may of course be effected within the spirit and scope of my invention.

What I claim is:

1. A transposition tower for electric circuit conductors comprising a support, a plurality of cross arms thereon, strain insulators extending from both sides of the arms at a like distance from the support and other strain insulators, extending toward each other from some of the arms at a different distance from the support.

2. A transposition tower for electric circuit conductors comprising a support, three parallel cross arms thereon, the intermediate one of which is shorter than the others, strain insulators extending from both sides of the intermediate arm near one of its ends, corresponding strain insulators extending from both sides of the longer cross arms and other strain insulators extending toward each other from different parts of said longer cross arms.

3. A transposition tower for electric circuit conductors comprising a substantially vertical supporting member, three horizontal cross arms thereon the intermediate one of which is shorter than the others, strain insulators extending laterally from both sides of the intermediate arm near its end, corresponding strain insulators extending from both sides of the upper and lower arms directly above and below the insulators of the intermediate arm, and other strain insulators near the ends of the longer cross arms extending toward each other, whereby an electric circuit conductor may approach one side of the tower, being connected to one of the laterally extending strain insulators of one of the cross arms, and depart from the opposite side of the tower by being secured to the extremity of another laterally extending insulator on the opposite side of another arm.

4. The combination with a plurality of substantially parallel electric transmission circuit conductors, of means for supporting and transposing the conductors that comprises two oppositely extending groups of strain insulators above one another and laterally offset guiding means, one of the conductors extending from the top insulator of one group to the bottom insulator of the opposite group and being held a fixed distance from the other conductors by said offset guiding means.

5. A transposition tower for electric circuit conductors comprising a support, a plurality of cross arms thereon, a plurality of strain insulators extending in substantially opposite directions from the arms and adapted to support the circuit conductors in their normal relation and other strain insulators extending from the arms at an angle to the first named insulators and arranged to transpose the conductors at the tower and to maintain said conductors fixed distances from one another.

6. The combination with a plurality of substantially parallel electric transmission circuit conductors, of means for supporting and transposing the conductors that comprises two oppositely extending groups of strain insulators and a pair of laterally offset guide insulators, two of said conductors extending from two adjacent insulators at one end of one group to two adjacent insulators at the other end of the opposite group and a third conductor extending from an insulator at one end of one group to an insulator at the other end of the opposite group, the last named conductor being held a fixed distance from the others by the laterally offset guide insulators.

In witness whereof, I have hereunto set my hand this 4th day of March in the year 1913.

LESTER A. MAGRAW.

Witnesses:
W. E. HOUSER,
W. H. FELTON, Jr.